US007315586B2

(12) United States Patent
Jalloul et al.

(10) Patent No.: US 7,315,586 B2
(45) Date of Patent: Jan. 1, 2008

(54) ADAPTIVE SEARCHER THRESHOLD SETTING USING CONSECUTIVE ISCP MEASUREMENTS

(75) Inventors: Louay Jalloul, San Jose, CA (US); Michael Kohlmann, San Francisco, CA (US)

(73) Assignee: Infineon Technologies AG (DE)

( * ) Notice: Subject to any disclaimer, the term of this patent is extended or adjusted under 35 U.S.C. 154(b) by 747 days.

(21) Appl. No.: 10/750,619

(22) Filed: Dec. 30, 2003

(65) Prior Publication Data

US 2005/0141643 A1 Jun. 30, 2005

(51) Int. Cl.
*H04L 25/06* (2006.01)
(52) U.S. Cl. ...................................... 375/317
(58) Field of Classification Search .............. 375/316, 375/317, 136, 144, 148; 329/318, 349, 353; 327/37, 80; 379/112.04; 702/193; 570/280; 455/67.11, 296, 522
See application file for complete search history.

(56) References Cited

U.S. PATENT DOCUMENTS

| 6,816,470 | B2* | 11/2004 | Kim et al. .................. 370/280 |
| 6,968,023 | B2* | 11/2005 | Aoyama et al. ............ 375/346 |
| 7,046,963 | B2* | 5/2006 | Luo et al. ................. 455/67.11 |
| 2004/0198294 | A1* | 10/2004 | Hagin-Metzer ............. 455/296 |
| 2005/0032540 | A1* | 2/2005 | Lee et al. .................... 455/522 |

FOREIGN PATENT DOCUMENTS

WO   WO-95/34136 A1   12/1995
WO   WO-00/004648 A1   1/2000

OTHER PUBLICATIONS

Peng et al. Handover Performance Analysis in TDD-CDMA Cellular Network 2003, IEEE,p. 806-811.*
Sousa E S et al.; "Delay spread measurements for the digital cellular channel in Toronto"; Personal, Indoor and Mobile Radio Communications, 1992, Proceedings, Third IEEE International Symposium in Boston, MA, USA, Oct. 19-21, 1992; pp. 80-85, XP010107123.
3 GPP TS 25.215 V5.4.0 (Jun. 2003) $3_{rd}$ Generation Partnership Project; Technical Specification Group Radio Access Network; Physical layer—Measurements (FDD) (Release 5).
3 GPP TS 25.302 V5.5.0 (Jun. 2003) $3_{rd}$ Generation Partnership Project; Technical Specification Group Radio Access Network; Services provided by the physical layer (Release 5).
3 GPP TS 25.133 V5.7.0 (Jun. 2003) $3_{rd}$ Generation Partnership Project; Technical Specification Group Radio Access Network; Requirements for support of radio resource management (FDD) (Release 5).
3GPP TS 25.215 V4.7.0 (Jun. 2003); *Technical Specification*; 3rd Generation Partnership Project; Technical Specification Group Radio Access Network; Physical layer - Measurements (FDD) (Release 4).

* cited by examiner

*Primary Examiner*—Sam K. Ahn
(74) *Attorney, Agent, or Firm*—Dickstein, Shapiro, LLP.

(57) ABSTRACT

Dynamic adjustment of searcher thresholds used to detect propagation paths of a communications signal transmitted from a transmitter to the base band receiver. Interference signal code power (ISCP) measurements of the communications signal are obtained from a database communicatively coupled with the base band receiver, wherein contents of the database are associated with a physical layer. A scaler is calculated based on the ISCP measurements only. The searcher thresholds, which are stored in the database, are adjusted using the scaler. The adjusted searcher thresholds are then stored in the database.

24 Claims, 3 Drawing Sheets

ADAPTIVE SEARCHER THRESHOLD SETTING USING CONSECUTIVE ISCP MEASUREMENTS

FIELD OF THE INVENTION

The present invention relates to third generation CDMA mobile systems, and more particularly to adapting searcher thresholds in a CDMA base band receiver using only interference signal code power (ISCP) measurements.

BACKGROUND OF THE INVENTION

Third generation code division multiple access (CDMA) mobile systems, such as Universal Mobile Telecommunication System (UMTS) Third Generation Partnership Program (3GPP) wideband code division multiple access (W-CDMA), use searcher thresholds to detect propagation paths while ensuring a constant probability of false alarm.

One conventional system for ensuring a constant probability of false alarm involves minimizing automatic gain control (AGC) jittering using highly accurate analog components. A disadvantage to this approach is the increased system cost due to the high cost of highly accurate analog components.

Another conventional system involves adding additional digital hardware for measuring the total of the received-signal power plus the interference power, after analog-to-digital (A/D) conversion, and feeding back the measured total-received-signal-plus-interference power to the AGC or use the measured value directly to normalize the power measurements. A disadvantage of this approach is the need for additional hardware and its attendant expense.

Both of these conventional systems will only allow normalization based on a combined measurement of both signal and interference power. However, in order to ensure a constant probability of false alarm, the normalization should ideally happen based only on the interference power.

BRIEF SUMMARY OF THE INVENTION

The present invention provides a method for dynamically adjusting searcher thresholds in a base band receiver, the searcher thresholds being used to detect propagation paths of a communications signal transmitted from a transmitter to the base band receiver. Interference signal code power (ISCP) measurements of the communications signal are obtained from a database communicatively coupled with the base band receiver, wherein contents of the database are associated with a physical layer. A scaler is calculated based on the ISCP measurements only. The searcher thresholds, which are stored in the database, are adjusted using the scaler. The adjusted searcher thresholds are then stored in the database.

DETAILED DESCRIPTION OF THE PREFERRED MODE OF THE INVENTION

By way of overview, the present invention provides a method and apparatus for dynamically adjusting searcher thresholds based on a transformation using a non-orthogonal interference signal code power (ISCP) measurement. Because the ISCP measurement is based on only interference power and not signal power, there is a constant probability of false alarm even for relatively high signal power. Moreover, because the ISCP measurements are readily available at the L1 processor, no additional hardware is needed.

The present invention is described by first providing an overview of a portion of a third-generation CDMA mobile system, followed by a description of propagation path detection, probability of false alarm, and physical layer measurements, and finally a description of adapting searcher thresholds according to the preferred mode of the present invention.

A. Overview of Portion of Third-Generation CDMA Mobile System

Figure 1:
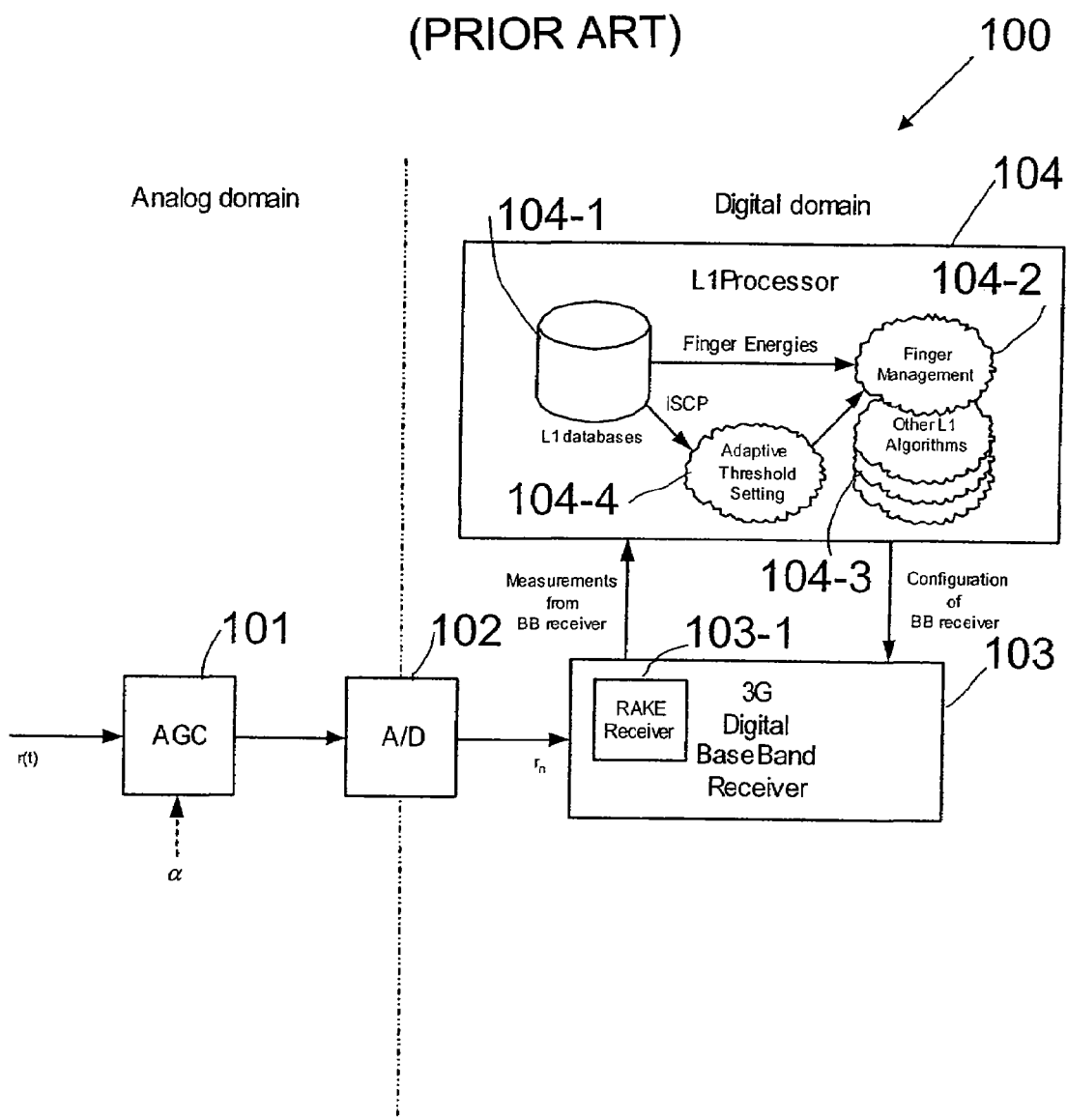
FIG. 1 illustrates a block diagram of an overview of a portion of a third-generation CDMA mobile system.

FIG. 1 illustrates a block diagram of an overview of a portion of a third-generation CDMA mobile system 100, including an automatic gain control (AGC) 101, an analog-to-digital (A/D) converter 102, a third-generation (3G) digital base band receiver 103, and a physical layer (L1) processor 104. Optimum usage of the digital base band receiver 103 requires constant average power level of a digital input signal $r_n$. The same applies to the analog input signal of the A/D converter 102. To ensure a fairly constant power level over time, the received analog signal r(t), which is the total received signal power of all mobile phones plus thermal noise, is scaled by the AGC 101. The AGC 101 typically scales the analog signal r(t) by comparing a filtered analog power measurement of the analog signal r(t) against a predefined target power known as an AGC set-point α. The accuracy of the AGC 101 is limited due to temperature effects and aging of its analog components.

The digital base band receiver 103 of FIG. 1 contains a RAKE receiver (not shown), which scans a power delay profile of the digital input signal $r_n$ for resolvable propagation paths using searcher thresholds (which are dynamically adapted, that is, set by a preferred mode of the present invention); accurate power measurement during this scanning is essential. The underlying processing of this scanning task is a core task of finger management, which is performed as represented in L1 processor 104.

Physical layer measurements provided by the base band receiver 103 are stored in the L1 databases 104-1 of L1 processor 104 and are used for various L1 processing algorithms 104-2 and 104-3. One of these algorithms is the RAKE receiver finger management algorithm 104-2, which uses both finger energy measurements and adaptive searcher threshold settings 104-4, which are based on ISCP measurements, to calculate values used to configure the base band receiver 103. The searcher thresholds are adaptive in order to account for jitter in the AGC 101.

B. Propagation Path Detection

Figure 2:
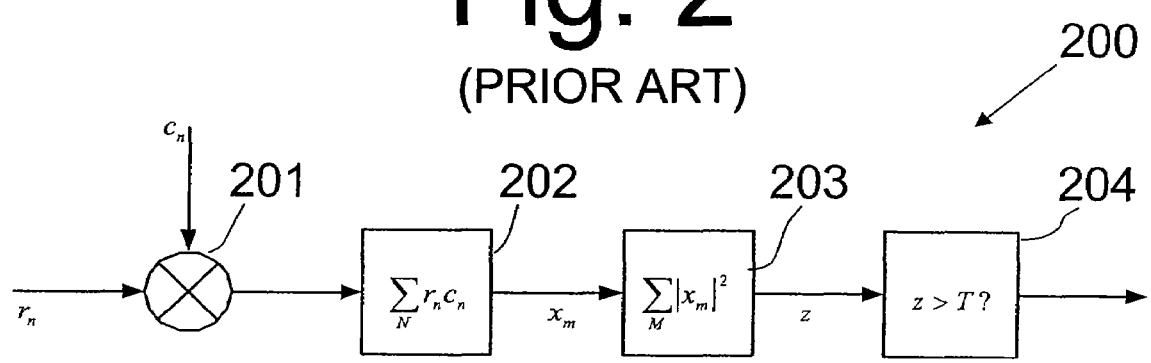
FIG. 2 illustrates a block diagram of a propagation path detection process.

FIG. 2 illustrates a block diagram of a propagation path detection process 200 performed by the RAKE receiver portion 103-1 of the base band receiver 103. Path power is measured by a correlator 201 correlating a complex received signal $r_n$ at chip level with an expected training sequence $c_n$, where n is a time index. The training sequence $c_n$ may be composed of a scrambling code, a channelization code, and a pilot pattern, and is a sequence of data bits known to the base band receiver 103. Because the receiver 103 knows the expected training sequence, it can measure and compare the actual received sequence with the expected training sequence, to thereby obtain a distortion characteristic (i.e., correlation signal) of that particular channel.

Summer 202 coherently integrates the correlation signal from correlator 201 over the training sequence length N to produce $x_m$, which is the complex correlation of the received signal $r_n$ with training sequence $c_n$. Error detector 203 then non-coherently integrates the mean square error (MSE) of $x_m$ over M accumulations of the energy measurement to produce detection variable z, which is a measure of the ISCP plus signal. Finally, comparator 204 compares the detection variable z with threshold T. If detection variable z is greater than threshold T, then a valid propagation path is detected; otherwise, no valid propagation path is detected.

At the end of an observation period, thresholds T are used to identify a certain time offset as a valid propagation path. Multiple correlation results may be combined non-coherently per observation period. The characteristic design parameters associated with a threshold T are probability of detection (i.e., power measurement exceeding threshold T at valid time offset, that is, when the signal is present) and probability of false alarm (i.e., power measurement exceeding threshold T at invalid time offset, that is, when the signal is absent and only noise is present).

The maximum number of paths is determined by the RAKE receiver portion 103-1. Valid propagation paths may be stored in a database such as 104-1, sorted, and then the propagation paths having the highest detection variable z may be selected. However, history may also be taken into account resulting in certain propagation paths with the highest detection variables not being selected; this is known as rules-based selection. Reasons for not selecting a propagation path with a high detection variable z include, but are not limited to, a likelihood that two propagation paths will merge into one another, or that a propagation path will extinguish at a certain point.

C. Probability of False Alarm

Typically, the observation period and thresholds are chosen such that the probability of false alarm stays below a certain value (e.g., $1 \, e^{-4}$) while still ensuring an acceptable probability of detection (i.e., >0.9) depending on available signal power. The knowledge and constancy in particular of the probability of false alarm is essential for allowing efficient finger management and thus important for the overall performance of the digital base band receiver 103.

Both the probability of detection and probability of false alarm are highly sensitive with respect to changes in the ratio of signal-plus-interference power to threshold setting. AGC gain above the target set-point α will cause an increased probability of false alarm, eventually leading to additional interference due to contribution of invalid propagation paths. AGC gain below the target set-point α will result in a decreased probability of detection and thus loss of valid propagation paths. Thus a core challenge is to maintain a certain probability of false alarm across the expected dynamics of signal and interference power, including the impact of AGC.

The probability of false alarm can be written as:

$$p_{fa} = e^{-\frac{T}{2\sigma_x^2}} \cdot \sum_{m=0}^{M-1} \frac{1}{m!} \left(\frac{T}{2\sigma_x^2}\right)^m \quad (1)$$

where $p_{fa}$ is the probability of false alarm, and $2\sigma_x^2$ is the combined variance of x on I and Q phase.

The interference signal code power (ISCP) is defined as the non-orthogonal interference signal code power measured on the code channel (DPCCH), that is, the Q phase only. Assuming the ISCP measurement is normalized to chip level, $\sigma_x^2$ can be expressed as:

$$\sigma_x^2 = N \cdot ISCP \quad (2)$$

where N is the total length of the training sequence. Equation (2) incorporated into Equation (1) can be expressed as:

$$p_{fa} = e^{-\frac{T}{2N \cdot ISCP}} \cdot \sum_{m=0}^{M-1} \frac{1}{m!} \left(\frac{T}{2N \cdot ISCP}\right)^m \quad (3).$$

Equation (3) is an important foundation of the invention, that is, that there is a constant probability of false alarm $p_{fa}$ for a constant ratio of T/ISCP.

Also, no additional hardware is required to detect ISCP because ISCP is already known at the base band receiver 103 as it is calculated for other 3GPP layers and the ISCP measurement used in these calculations is stored in Layer 1 database 104-1. More specifically, UMTS Terrestrial Radio Access Network (UTRAN), which is a term describing radio network controllers and node base stations of a UMTS network, requires measurement of signal-to-interference ratio (SIR), which is defined as:

$$SIR = \frac{RSCP}{ISCP} \cdot SF \quad (4)$$

where RSCP is the measurement of received signal code power, and SF is the spreading factor on the code channel (DPCCH), and it is in this measurement that ISCP is used and for which it has already been measured.

D. Physical Layer Measurements

The 3GPP standard does not dictate how measurements are executed in the physical layer (L1), however, the standard does dictate the reporting period and accuracy of the measurements. For the SIR measurement, the 3GPP, TS 25.133 V5.7.0 standard requires a reporting period of 80 ms and an accuracy of +/−3 dB for −7 dB<SIR<20 dB.

UTRAN requires a SIR measurement for every uplink connection. The uplink received signal is composed of a superposition of all U uplink connections plus thermal noise of power N. The total received signal power S at chip level is represented as:

$$S = \sum_{u=0}^{U-1} RSCP_u + N \quad (5).$$

The ISCP for each uplink connection is represented as:

$$ISCP_u = S - RSCP_u \quad (6).$$

At chip level the contribution of an individual uplink connection is typically negligible with respect to the overall power of the received signal (i.e. $RSCP_u \ll S$, $u \in [0, \ldots, U-1]$). Thus the following relationship is obtained:

$$ISCP_u \approx S, u \in [0, \ldots, U-1] \quad (7).$$

According to Equation (7), all uplink connections have almost the same interference signal code power. Thus, it is possible to take the average of the ISCP measurements across all uplink connections to improve the measurement accuracy, that is, $$ISCP = \frac{1}{U}\sum_{u=0}^{U} ISCP_u \qquad (8).$$

E. Adapting Searcher Thresholds According to the Preferred Mode

The present invention will now be described with respect to a preferred mode having a UTRAN with 24 (i.e., U=24) active uplink connections. As required by the 3GPP, the physical layer (L1) provides one ISCP measurement per 80 ms for each uplink connection. For the sake of the following discussion, it is assumed that each uplink connection has a path assignment update every 40, 60, or 80 ms.

1. Initial Calibration of ISCP

The initial calibration of ISCP involves four steps, as described in the following paragraphs.

The first step is to select an automatic gain control (AGC) set-point α based on expected dynamics of the received signal r(t) and the characteristics of the A/D converter 102. That is, the AGC set-point α is set such that the signal input to the A/D converter 102 is within the operating range of the A/D converter 102.

The second step is to determine, for each uplink connection (u=1 . . . U), the initial threshold $T_u$ that provides a desired probability of false alarm for the chosen AGC set-point α The desired probability of false alarm should ideally be within the range of $1\times10^{-4}$ and $1\times10^{-3}$.

The third step is to select a common update period for adjusting searcher thresholds. The searcher thresholds must remain constant during a path assignment period of the respective uplink connection. Thus, the common update period should be an integer multiple of different path assignment periods used in the receiver. If it is assumed that each uplink connection has a path assignment update every 40, 60, or 80 ms as discussed above, then an acceptable update period ($t_{update}$) would be 240 ms, because it is an integer multiple of 40, 60, and 80 ms.

Finally, the fourth step is to measure the total average ISCP corresponding to the initial AGC set-point α. The measurement can be obtained while calculating the desired probabilities of false alarm for each uplink connection. To get the total average ISCP, the ISCP 80 ms measurements for all uplink connections are integrated over $t_{update}$ and then averaged across all uplink connections.

2. Adapting Searcher Thresholds Based on ISCP Measurements

Figure 3:
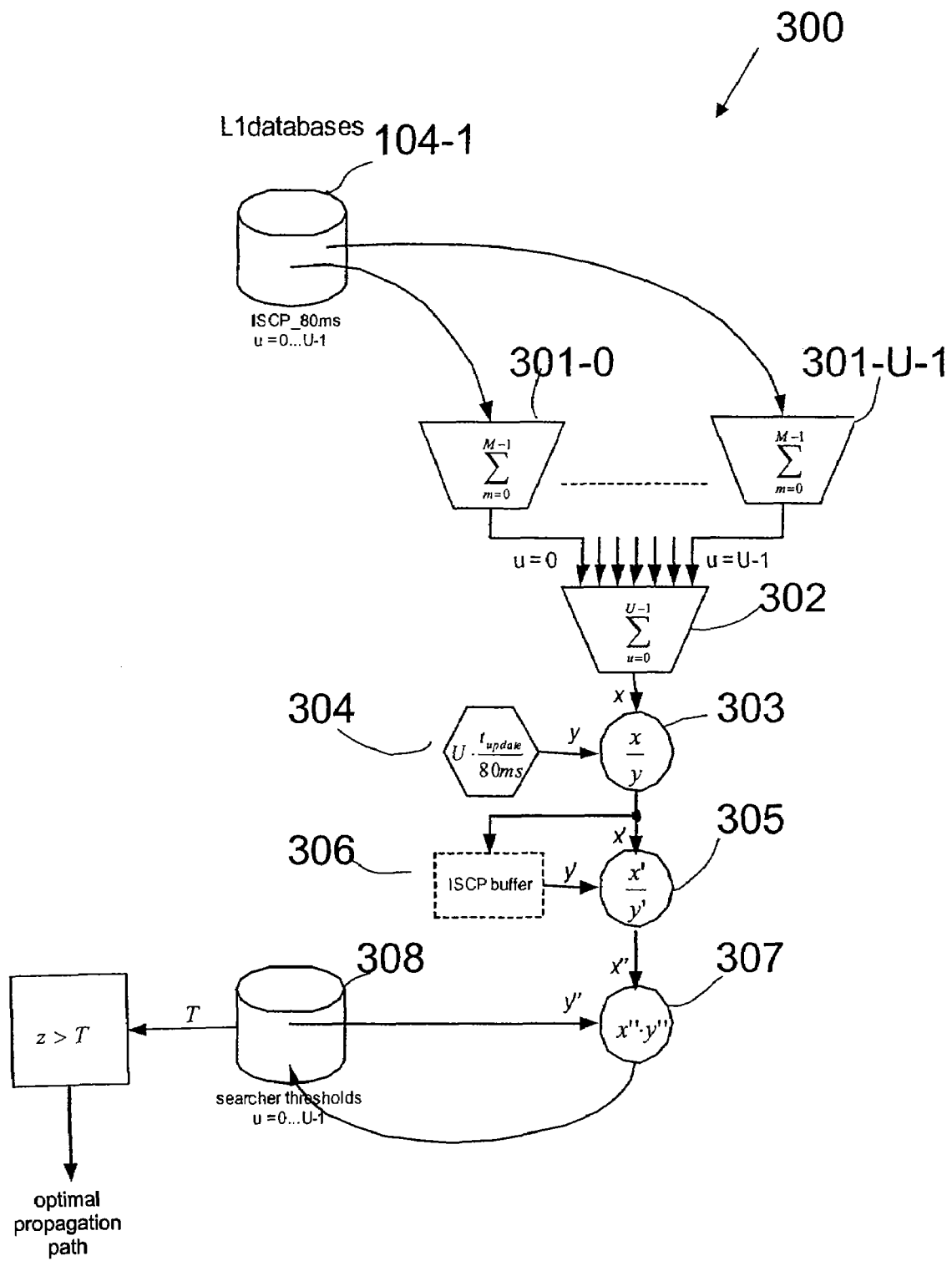
FIG. 3 illustrates a flowchart for adapting searcher thresholds based on ISCP measurements according to the present invention.

FIG. 3 illustrates a flowchart 300 for adapting searcher thresholds based on ISCP measurements according to the preferred mode of the present invention. This adaptive algorithm is an example of the adaptive threshold setting algorithm performed in the L1 processor 104 of FIG. 1.

The L1 databases 104-1 provide ISCP measurements (ISCP_80 ms) for each finger in each uplink connection (u=0 to U-1) every 80 ms. Each of summers 301-0 to 301-U-1 sums the ISCP measurements of all fingers (m=0 to M-1) of the respective uplink connections to provide individual uplink ISCP sums. Summer 302 then sums the individual uplink ISCP sums to produce a total ISCP (x).

Normalizer 303 then normalizes the total ISCP (x) over y, which is the number of uplink connections U times the number of threshold updates ($t_{update}$) per 80 ms measurements. More specifically, the number of uplink connections U times the threshold update $t_{update}$ divided by 80 ms is stored in buffer 304; the normalizer 303 divides the total ISCP (x) by the value stored in buffer 304 (i.e., y, or total ISCP·80 ms/U·$t_{update}$) to calculate the normalized value of the total ISCP (x') for the present observation period.

Scaler calculator 305 then divides the normalized value of the total ISCP (x') by a previous normalized value of the prior observation period total ISCP (y'), which has been stored in ISCP buffer 306, to calculate a scaler value (x"). Scaler 307 then obtains previous searcher thresholds (y") for each of the uplink connections (u=0 to U-1) from a searcher threshold database 308, scales each the previous searcher thresholds (y") for each of the uplink connections using scaler value x" by multiplying the scaler value x" by each of the previous searcher thresholds (y"), and restores the scaled searcher thresholds T back in the searcher threshold database 308, thereby adjusting for the jitter in the AGC 101 (shown in FIG. 1). These scaled searcher thresholds T are then used as the newly-adapted search thresholds T to be compared with detection values z to detect propagation paths in a communications signal.

While the invention has been described in detail with particular reference to certain embodiments thereof, the invention is capable of other and different embodiments, and its details are capable of modifications in various obvious respects. As would be readily apparent to those skilled in the art, variations and modifications can be affected while remaining within the spirit and scope of the invention. Accordingly, the foregoing disclosure, description, and drawing figures are for illustrative purposes only, and do not in any way limit the invention, which is defined only by the claims.

What is claimed is:

1. A method for dynamically adjusting searcher thresholds in a base band receiver, the searcher thresholds being used to detect propagation paths of a communications signal transmitted from a transmitter to the base band receiver, the method comprising the steps of:

obtaining interference signal code power (ISCP) measurements of the communications signal from a database communicatively coupled with the base band receiver, wherein contents of the database are associated with a physical layer;

calculating a scaler based on normalized values of the ISCP measurements only;

adjusting the searcher thresholds, which are stored in the database, using the scaler; and storing the adjusted searcher thresholds in the database.

2. The method of claim 1, further comprising the steps of:

summing the ISCP measurements to create a total ISCP; and normalizing the total ISCP;

wherein the scaler is calculated based on the normalized total ISCP.

3. The method of claim 1, wherein the step of obtaining ISCP measurements comprises the steps of:

populating a memory location with the ISCP measurements during physical layer processing; and accessing the memory location.

4. The method of claim 1, wherein the step of calculating the scaler comprises the steps of:

calculating a total ISCP by adding the ISCP measurements of all fingers of all uplinks;

calculating a normalized value of the total ISCP; and
dividing the normalized value of the total ISCP by a delayed value of ISCP.

5. The method of claim 4, wherein the normalized value of the total ISCP is calculated by dividing the total ISCP by a buffered value equal to a number of uplink connections times a threshold update time divided by a predetermined observation period.

6. The method of claim 5, wherein the predetermined observation period is 80 ms.

7. The method of claim 1, wherein the step of adjusting the searcher thresholds comprises the step of multiplying the searcher thresholds by the scaler.

8. The method of claim 7, wherein the searcher thresholds are searcher thresholds of respective uplinks.

9. A method for identifying optimal propagation paths of a communications signal transmitted from a transmitter to a base band receiver, the method comprising the steps of:
obtaining interference signal code power (ISCP) measurements of the communications signal from a database communicatively coupled with the base based receiver, wherein contents of the database are associated with a physical layer;
calculating a scaler based on normalized values of the ISCP measurements only;
adjusting searcher thresholds, which are stored in the database, using the scaler;
storing the adjusted searcher thresholds in the database;
comparing the adjusted searcher thresholds with detection values of propagation paths of the communications signal; and
identifying the optimal propagation paths.

10. The method of claim 9, wherein the identifying step comprises:
sorting the propagation paths based on their respective detection values; and
selecting as the optimal propagation paths the propagation paths having a highest detection value.

11. The method of claim 9, including the additional step of storing historical data concerning the propagation paths, and wherein the selecting step is based further upon the historical data.

12. The method of claim 10, including the additional step of storing historical data concerning the propagation paths, and wherein the selecting step is based further upon the historical data.

13. A system for dynamically adjusting searcher thresholds in a base band receiver, the searcher thresholds being used to detect propagation paths of a communications signal transmitted from a transmitter to the base band receiver, the system comprising:
means for obtaining interference signal code power (ISCP) measurements of the communications signal from a database communicatively coupled with the base band receiver, wherein contents of the database are associated with a physical layer;
means for calculating a scaler based on normalized values of the ISCP measurements only;
means for adjusting the searcher thresholds, which are stored in the database, using the scaler; and
means for storing the adjusted searcher thresholds in the database.

14. The system of claim 13, further comprising:
means for summing the ISCP measurements to create a total ISCP; and
means for normalizing the total ISCP;
wherein the scaler is calculated based on the normalized total ISCP.

15. The system of claim 13, wherein the means for obtaining ISCP measurements comprises:
means for populating a memory location with the ISCP measurements during physical layer processing; and
means for accessing the memory location.

16. The system of claim 13, wherein the means for calculating the scaler comprises:
means for calculating a total ISCP by adding the ISCP measurements of all fingers of all uplinks;
means for calculating a normalized value of the total ISCP; and
means for dividing the normalized value of the total ISCP by a delayed value of ISCP.

17. The system of claim 16, wherein the means for calculating the normalized value of the total ISCP comprises means for dividing the total ISCP by a buffered value equal to a number of uplink connections times a threshold update time divided by a predetermined observation period.

18. The system of claim 17, wherein the predetermined observation period is 80 ms.

19. The system of claim 13, wherein the means for adjusting the searcher thresholds comprises a means for multiplying the searcher thresholds by the scaler.

20. The system of claim 19, wherein the searcher thresholds are searcher thresholds of respective uplinks.

21. A system for identifying optimal propagation paths of a communications signal transmitted from a transmitter to a base band receiver, comprising:
means for obtaining interference signal code power (ISCP) measurements of the communications signal from a database communicatively coupled with the base based receiver, wherein contents of the database are associated with a physical layer;
means for calculating a scaler based on normalized values of the ISCP measurements only;
means for adjusting searcher thresholds, which are stored in the database, using the scaler;
means for storing the adjusted searcher thresholds in the database;
means for comparing the adjusted searcher thresholds with detection values of propagation paths of the communications signal; and
means for identifying the optimal propagation paths.

22. The system of claim 21, wherein the means for identifying comprises:
means for sorting the propagation paths based on their respective detection values; and
means for selecting as the optimal propagation paths the propagation paths having a highest detection value.

23. The system of claim 21, additionally including means for storing historical data concerning the propagation paths, and wherein the means for selecting selects optimal propagation paths based further upon the historical data.

24. The system of claim 22, additionally including means for storing historical data concerning the propagation paths, and wherein the means for selecting selects optimal propagation paths based further upon the historical data.

* * * * *

UNITED STATES PATENT AND TRADEMARK OFFICE
CERTIFICATE OF CORRECTION

| | | |
|---|---|---|
| PATENT NO. | : 7,315,586 B2 | Page 1 of 1 |
| APPLICATION NO. | : 10/750619 | |
| DATED | : January 1, 2008 | |
| INVENTOR(S) | : Louay Jalloul et al. | |

It is certified that error appears in the above-identified patent and that said Letters Patent is hereby corrected as shown below:

Item (56) in the References Cited:

Title page, under Other Publications, at column 2, line 7, "$3_{rd}$" should read --$3^{rd}$--.

Title page, under Other Publications, at column 2, line 10, "$3_{rd}$" should read --$3^{rd}$--.

Tile page, under Other Publications, at column 2, line 13, "$3_{rd}$" should read --$3^{rd}$--.

At column 5, line 34, after "α" insert --.--

Signed and Sealed this

Twenty-seventh Day of May, 2008

JON W. DUDAS
*Director of the United States Patent and Trademark Office*